United States Patent
Uchiyama et al.

(10) Patent No.: US 9,674,410 B2
(45) Date of Patent: Jun. 6, 2017

(54) ELECTRONIC DEVICE MODULE

(71) Applicant: Japan Aviation Electronics Industry, Limited, Tokyo (JP)

(72) Inventors: Yuichi Uchiyama, Tokyo (JP); Masao Higuchi, Tokyo (JP); Tadashi Ishiwa, Tokyo (JP); Masayoshi Nitta, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 407 days.

(21) Appl. No.: 14/140,924

(22) Filed: Dec. 26, 2013

(65) Prior Publication Data
US 2015/0029337 A1    Jan. 29, 2015

(30) Foreign Application Priority Data
Jul. 29, 2013    (JP) .................................. 2013-156623

(51) Int. Cl.
| H04N 5/225 | (2006.01) |
| H04N 7/18 | (2006.01) |
| H01R 4/06 | (2006.01) |
| H01R 13/6581 | (2011.01) |
| H01R 13/52 | (2006.01) |

(52) U.S. Cl.
CPC ............. *H04N 5/2252* (2013.01); *H01R 4/06* (2013.01); *H01R 13/6581* (2013.01); *H04N 5/2257* (2013.01); *H04N 7/18* (2013.01); *H01R 13/5216* (2013.01)

(58) Field of Classification Search
USPC ........................................................ 348/148
See application file for complete search history.

(56) References Cited

U.S. PATENT DOCUMENTS

| 8,422,247 | B2 * | 4/2013 | Kameyama | .......... | H01R 13/506 174/258 |
| 2011/0096524 | A1 * | 4/2011 | Kameyama | .......... | H01R 13/506 361/818 |
| 2011/0279675 | A1 | 11/2011 | Mano et al. | | |

FOREIGN PATENT DOCUMENTS

| CN | 201106815 | 8/2008 |
| CN | 102037619 | 4/2011 |
| EP | 1 990 873 A1 | 11/2008 |
| JP | 2009 283280 | 12/2009 |
| WO | WO 2007/053404 A2 | 5/2007 |

* cited by examiner

*Primary Examiner* — Paulos M Natnael
(74) *Attorney, Agent, or Firm* — Muncy, Geissler, Olds & Lowe, P.C.

(57) ABSTRACT

An electronic device module includes a metallic casing having at least one boss formed therein, an electronic device unit placed inside the casing, connector terminals for external device connection electrically connected to the electronic device unit, and a metallic ground shell disposed so as to surround the connector terminals, having a front surface covered with a metal coated layer and including at least one boss insertion portion formed, a head of the at least one boss inserted into the at least one boss insertion portion and the coated layer positioned on a periphery of the corresponding at least one boss insertion portion being welded to each other to electrically connect and fix the ground shell to the casing.

14 Claims, 7 Drawing Sheets

FIG. 20A  FIG. 20B  FIG. 20C  FIG. 20D
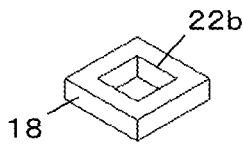 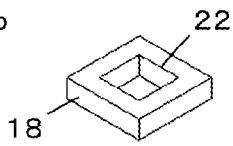 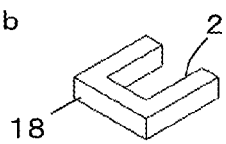 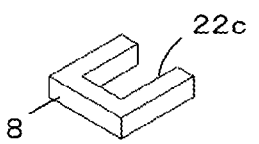
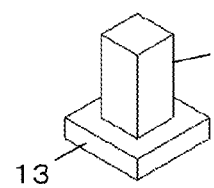 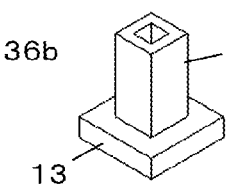 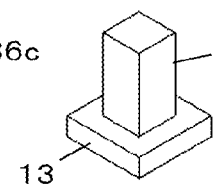 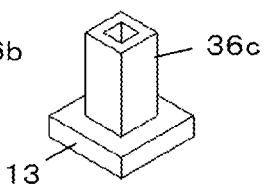
FIG. 21A  FIG. 21B  FIG. 21C  FIG. 21D
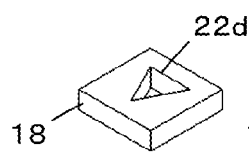 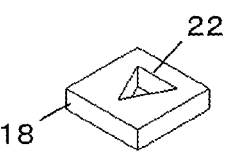 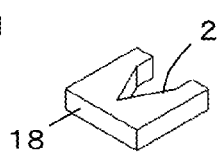 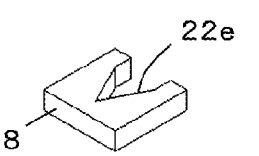
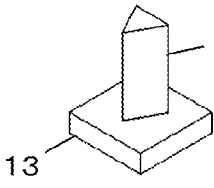 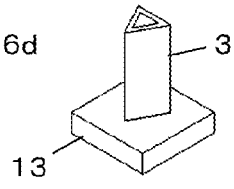 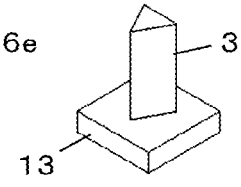 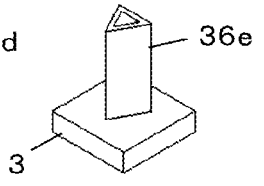
FIG. 22
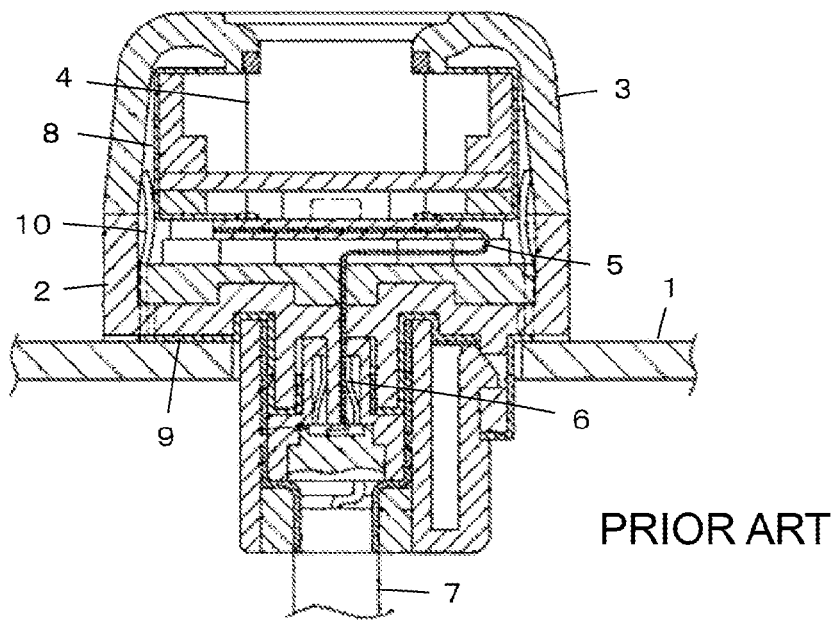
PRIOR ART

ELECTRONIC DEVICE MODULE

BACKGROUND OF THE INVENTION

The present invention relates to an electronic device module and more specifically to an electronic device module in which an electronic device unit to be connected to an external device via connector terminals is placed in a casing.

An in-vehicle camera for capturing a rear or front view of a vehicle and displaying the resulting image on a monitor disposed on an instrument panel is often used for such purposes as car parking assistance and improvement of a driving safety. Such an in-vehicle camera is attached to a part of a vehicle body and is connected to the monitor near a driver's seat via a connector and a wire harness, and image signals acquired by an image sensor in the camera such as a CMOS (complementary metal-oxide semiconductor) or a CCD (charge-coupled device) are transmitted to the monitor. However, the in-vehicle camera is susceptible to electromagnetic disturbance or the like and an image quality may be deteriorated.

Then, for example, JP 2009-283280 A discloses an in-vehicle camera module adapted to shield using conductive shells.

As shown in FIG. 22, this camera module includes a lower casing 2 fixed to a rear panel 1 of an automobile and an upper casing 3 joined to the lower casing 2. A camera unit 4 disposed in the upper casing 3 is connected to a wire harness 7 via an FPC (flexible printed circuit) 5 and connector terminals 6. A shield shell 8 is disposed in the upper casing 3 so as to surround the periphery of the camera unit 4 and a ground shell 9 is disposed in the lower casing 2. A plurality of arc-like contact pieces 10 extending from the ground shell 9 toward the upper casing 3 are brought into contact with the shield shell 8 to electrically connect the shield shell 8 and the ground shell 9 to each other thereby shielding the camera unit 4.

However, according to the camera module in JP 2009-283280 A, the arc-like contact pieces 10 of the ground shell 9 are formed to be brought into elastic contact with the shield shell 8, in other words, so-called spring contacts are formed to establish the electric connection between the shield shell 8 and the ground shell 9. Therefore, the spring contacts may deteriorate during a long-term use to increase their resistance values and reduce shielding effectiveness.

There is also a problem that the internal configuration of the camera module is complicated due to forming of the spring contacts.

SUMMARY OF THE INVENTION

The present invention has been made to solve the above-described prior art problems and an object of the present invention is to provide an electronic device module capable of obtaining consistent shielding effectiveness with a simple configuration.

An electronic device module according to the present invention comprises a metallic casing having at least one boss formed therein, an electronic device unit placed inside the casing, connector terminals for external device connection electrically connected to the electronic device unit and used to connect the electronic device unit to an external device, and a metallic ground shell disposed so as to surround the connector terminals for external device connection, having a front surface covered with a metal coated layer and including at least one boss insertion portion formed so as to correspond to the at least one boss of the casing, wherein the at least one boss has a head exposed at the front surface of the ground shell covered with the coated layer upon insertion of the at least one boss into the at least one boss insertion portion corresponding to the at least one boss, and wherein the head of the at least one boss being inserted into the at least one boss insertion portion corresponding to the at least one boss, and the coated layer positioned on a periphery of the at least one boss insertion portion corresponding to the at least one boss are welded to each other to electrically connect and fix the ground shell to the casing.

BRIEF DESCRIPTION OF THE DRAWINGS

FIGS. 20A to 20D are perspective views showing various combinations of a boss and a boss insertion portion that may be used in an electronic device module according to a modified example of Embodiment 2.

FIGS. 21A to 21D are perspective views showing various combinations of a boss and a boss insertion portion that may be used in an electronic device module according to another modified example of Embodiment 2.

FIG. 22 is a cross-sectional view showing a conventional electronic device module.

DETAILED DESCRIPTION OF THE INVENTION

Embodiments of the invention are described below with reference to the accompanying drawings.

Embodiment 1

Figure 1:
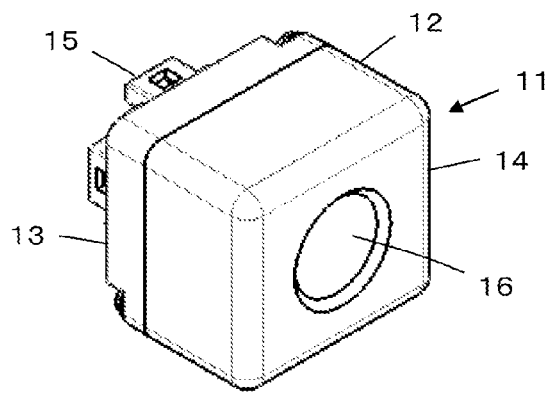
FIG. 1 is a perspective view as seen from the front side of an electronic device module according to Embodiment 1 of the invention.

FIG. 1 shows the configuration of an electronic device module 11 according to Embodiment 1 of the invention. The electronic device module 11 is applied to an in-vehicle camera module attached to a part of a body of an automobile and includes a metallic casing 12 having the shape of a rectangular parallelepiped. The casing 12 includes a casing body 13 and a cover member 14 joined to a front side of the casing body 13, and a part of an outer housing 15 made of an insulating material such as resin protrudes on a back side of the casing body 13. A lens portion 16 of the in-vehicle camera is formed at a central portion of a front face of the cover member 14.

Figure 2:
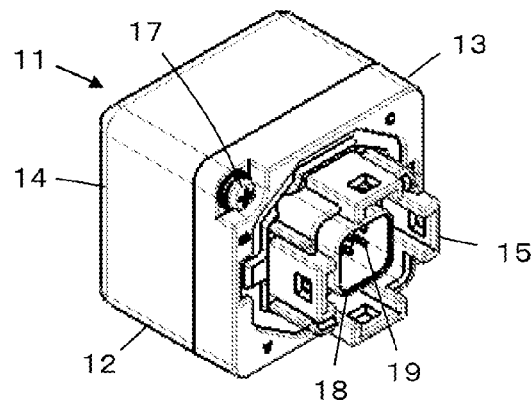
FIG. 2 is a perspective view as seen from the back side of the electronic device module according to Embodiment 1.

As shown in FIG. 2, the cover member 14 is fixed to the casing body 13 with screws 17. A part of a metallic ground shell 18 is disposed inside the outer housing 15 protruding on the back side of the casing body 13. In addition, connector terminals 19 for external device connection are exposed inside the ground shell 18.

Figure 3:
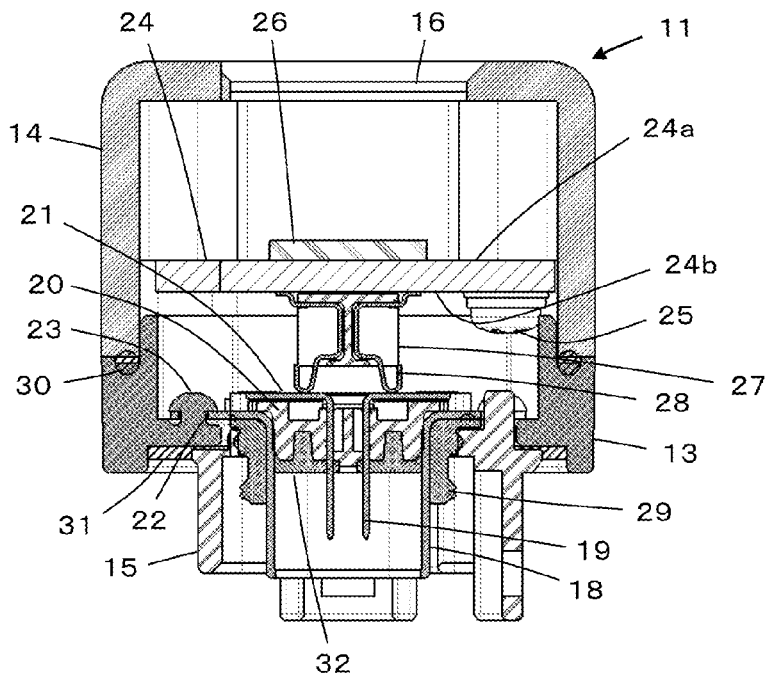
FIG. 3 is a cross-sectional view showing the internal configuration of the electronic device module according to Embodiment 1.

The internal configuration of the electronic device module 11 is shown in FIG. 3. The ground shell 18 is fixed to the casing body 13, and the outer housing 15 and the inner housing 20 are fixed to the ground shell 18. The inner housing 20 is formed of an insulating material such as resin and holds the connector terminals 19 for external device connection. The inner housing 20 also holds on its surface electrode portions 21 connected to the connector terminals 19 for external device connection.

The ground shell 18 has boss insertion portions 22 formed of holes for passing bosses formed in the casing body 13 therethrough, and the bosses of the casing body 13 inserted in the boss insertion portions 22 are melted by heating to form metal weld zones 23 on the surface of the ground shell 18, so that the ground shell 18 is electrically connected and fixed to the casing body 13.

On the other hand, a printed circuit board 24 is fixed to the interior of the cover member 14 with screws 25, and an image sensor 26 composed of a CMOS (complementary metal-oxide semiconductor) or a CCD (charge-coupled device) is mounted as an electronic component on a front surface 24a of the printed circuit board 24 facing toward the lens portion 16. A board connector 27 is fixed onto a rear surface 24b of the printed circuit board 24, and one end of each of board connector terminals 28 held on the board connector 27 is connected to a corresponding electrode of the image sensor 26 via an interconnect layer of the printed circuit board 24, whereas the other end of each of the board connector terminals 28 is in contact with the corresponding electrode portion 21 held on the inner housing 20. In this way, the electrodes of the image sensor 26 are connected to the connector terminals 19 for external device connection via the interconnect layer of the printed circuit board 24, the board connector terminals 28 and the electrode portions 21.

It should be noted that a camera unit serving as an electronic device unit is made up of the printed circuit board 24, the image sensor 26 and the board connector 27.

A first annular waterproof member 29 made of, for example, rubber is disposed between the ground shell 18 and the outer housing 15, and a second annular waterproof member 30 made of, for example, rubber is also disposed between the casing body 13 and the cover member 14. In addition, a sealed portion 31 formed by potting is disposed between the casing body 13 and the outer housing 15, and a sealed portion 32 formed by potting is also disposed between the ground shell 18 and the connector terminals 19 for external device connection so as to cover the back side portion of the inner housing 20.

A waterproof structure is made up of the first waterproof member 29, the second waterproof member 30 and the sealed portions 31 and 32.

Figure 4A:
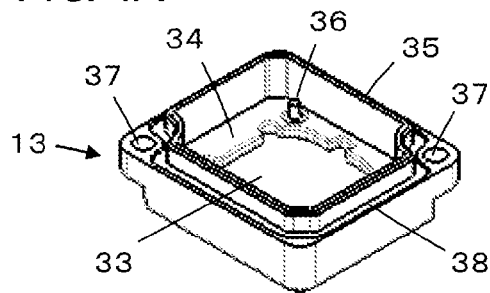
FIGS. 4A and 4B are perspective views as seen from the front side and the back side, respectively, of a casing body for use in the electronic device module according to Embodiment 1.
Figure 4B:
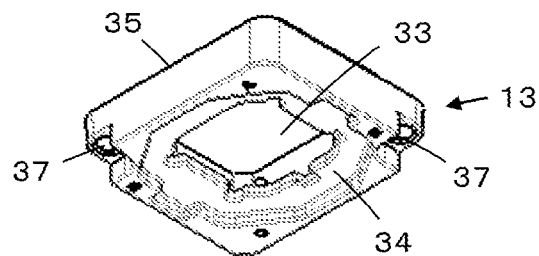

As shown in FIGS. 4A and 4B, the casing body 13 includes a bottom plate 34 with a substantially rectangular shape having an opening 33 formed at the center thereof and a peripheral wall 35 formed on the perimeter of the bottom plate 34. The protruding bosses 36 are formed inside the peripheral wall 35 on the surface of the bottom plate 34. FIG. 4A shows only one of the bosses 36 formed in the vicinity of one corner inside the peripheral wall 35 but the bosses 36 of the same size and shape are formed in the vicinities of three corners, respectively, out of four corners of the peripheral wall 35.

A mounting hole 37 is formed at each of two end positions on one diagonal line of the rectangular bottom plate 34. An annular groove 38 which extends along the peripheral wall 35 and which serves to receive the second waterproof member 30 is formed at the upper surface of the peripheral wall 35.

Figure 5A:
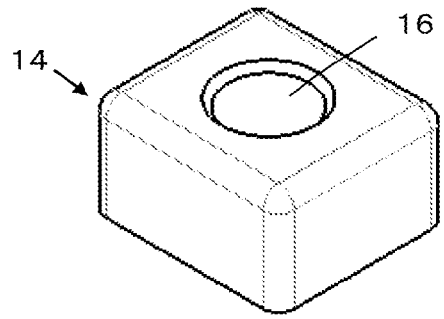
FIGS. 5A and 5B are perspective views as seen from the front side and the back side, respectively, of a cover member for use in the electronic device module according to Embodiment 1.
Figure 5B:
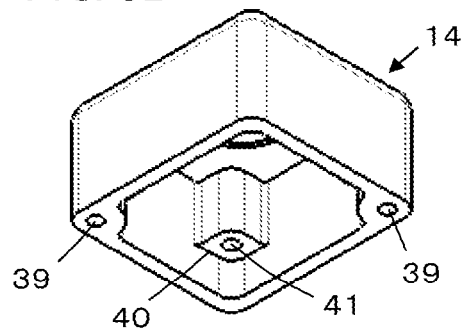

The cover member 14 is shown in FIGS. 5A and 5B. The cover member 14 has a box shape with the back side opened, and a screw hole 39 for fixing the casing body 13 is formed at each of two end positions on one diagonal line at the back side edge portion. Inside the cover member 14, a base 40 for supporting the printed circuit board 24 is formed at each of two corners positioned on the other diagonal line different from the diagonal line on which the screw holes 39 are disposed, and a screw hole 41 is formed in each of the bases 40.

The casing body 13 and the cover member 14 are each made of, for example, an aluminum material and can be manufactured by die-casting.

Figure 6A:
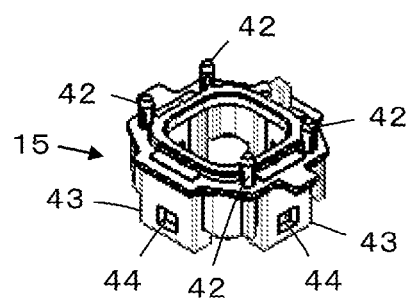
FIGS. 6A and 6B are perspective views as seen from the front side and the back side, respectively, of an outer housing for use in the electronic device module according to Embodiment 1.
Figure 6B:
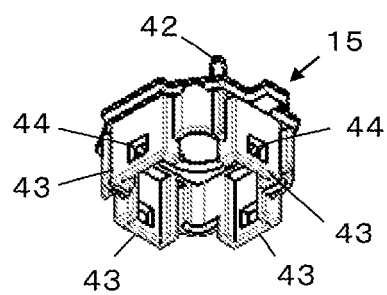

The outer housing 15 is adapted to be fitted into a connector housing of an external device side connector which is to be connected to the electronic device module 11. As shown in FIGS. 6A and 6B, the outer housing 15 has an approximately cylindrical shape and includes four protrusions 42 which extend from one end of the cylinder along the axial direction of the cylinder. In addition, four plate-like legs 43 extending in the opposite direction to the protrusions 42 are formed and a hook hole 44 is formed in each of the legs 43.

Figure 7A:
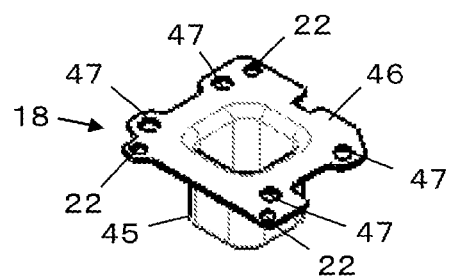
FIGS. 7A and 7B are perspective views as seen from the front side and the back side, respectively, of a ground shell for use in the electronic device module according to Embodiment 1.
Figure 7B:
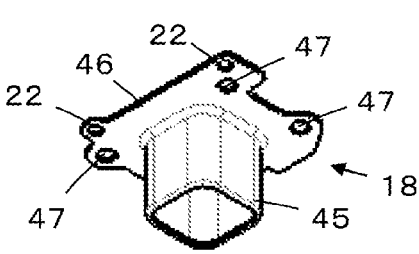

As shown in FIGS. 7A and 7B, the ground shell 18 has a cylindrical portion 45 and a flat plate portion 46 extending on the periphery at one end of the cylindrical portion 45. The flat plate portion 46 has four mounting holes 47 formed therein corresponding to the four protrusions 42 of the outer housing 15 and the three boss insertion portions 22 formed therein corresponding to the three bosses 36 of the casing body 13 and formed of holes.

Figure 8A:
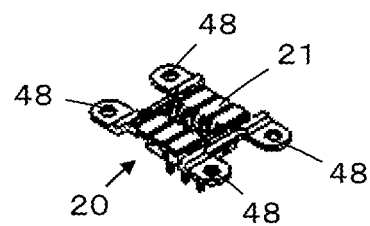
FIGS. 8A and 8B are perspective views as seen from the front side and the back side, respectively, of an inner housing for use in the electronic device module according to Embodiment 1.
Figure 8B:
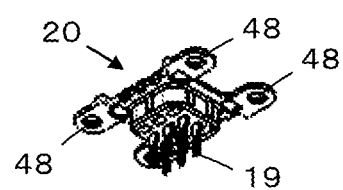

As shown in FIGS. 8A and 8B, the inner housing 20 holds the plurality of electrode portions 21 formed and arrayed on the front side and the connector terminals 19 for external device connection connected to their corresponding electrode portions 21 protrude on the back side of the inner housing 20. In addition, the inner housing 20 has four mounting holes 48 formed therein corresponding to the four protrusions 42 of the outer housing 15.

The outer housing 15 is formed so as to be larger than the opening 33 of the casing body 13 and hence cannot pass through the opening 33. However, the four protrusions 42 of the outer housing 15 are formed at the positions where the protrusions 42 can pass through the opening 33 of the casing body 13. In addition, the cylindrical portion 45 of the ground shell 18 has a sufficient size to allow the insertion in the opening 33 of the casing body 13 and the inside of the cylindrical outer housing 15, and the flat plate portion 46 of the ground shell 18 is formed so as to be larger than the opening 33 of the casing body 13.

Figure 9:
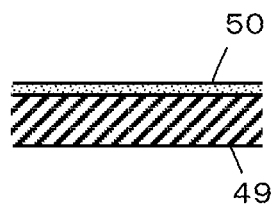
FIG. 9 is a partial cross-sectional view of a plate making up the ground shell.

In addition, the ground shell 18 is formed of an iron plate 49 having on its surface a tin-plated layer 50 as a covering layer, as shown in FIG. 9, and is manufactured by, for example, subjecting the plate 49 to press working and then tinning the surface of the plate 49.

Each of the outer housing 15 and the inner housing 20 can be formed of an insulating resin and the outer housing 15 is manufactured by, for example, mold-forming a resin material. The inner housing 20 in which the resin material is integrated with the connector terminals 19 for external device connection and the electrode portions 21 can also be manufactured by insert molding.

Next, a method of assembling the electronic device module 11 is described.

Figure 10A:
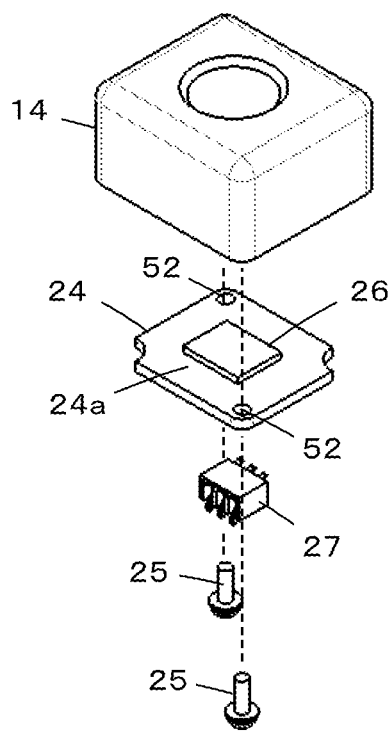
FIGS. 10A and 10B are assembly diagrams as seen from the front side and the back side, respectively, in incorporating an electronic device unit in the cover member.
Figure 10B:
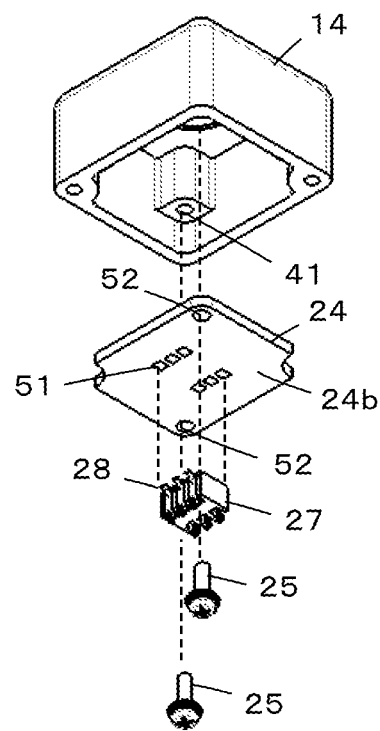

First of all, as shown in FIGS. 10A and 10B, the image sensor 26 is mounted on the front surface 24a of the printed circuit board 24 and the board connector 27 is mounted on the rear surface 24b of the printed circuit board 24 by soldering one end of each of the board connector terminals 28 of the board connector 27 onto a corresponding mounting pad 51 which is disposed on the rear surface 24b of the printed circuit board 24 and connected to the corresponding electrode of the image sensor 26 through the interconnect layer in the printed circuit board 24. The screws 25 are passed through mounting holes 52 formed in the printed circuit board 24 and screwed into the screw holes 41 of the cover member 14 to fix the printed circuit board 24 to the cover member 14.

Figure 11A:
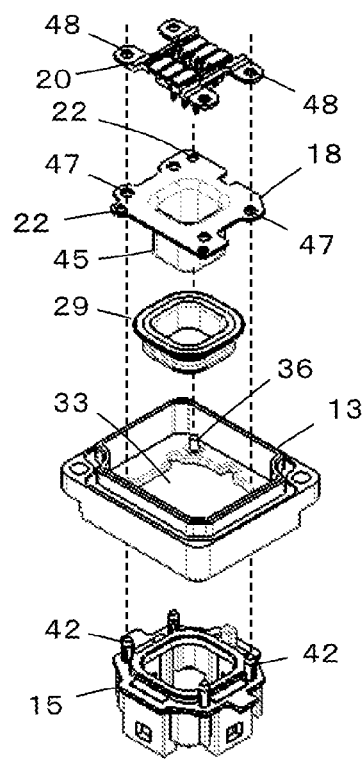
FIGS. 11A and 11B are assembly diagrams as seen from the front side and the back side, respectively, in incorporating the inner housing, the ground shell and the outer housing in the casing body.
Figure 11B:
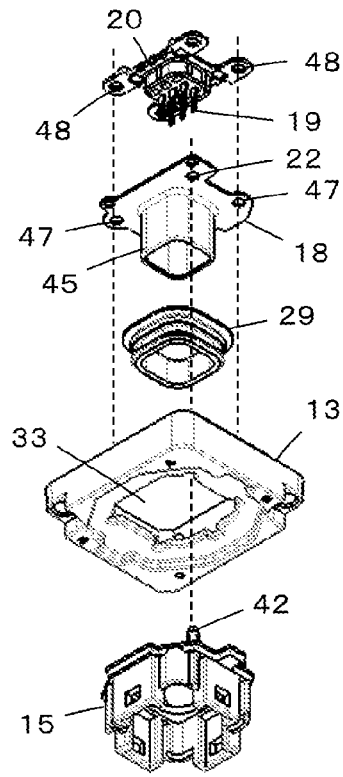

In addition, as shown in FIGS. 11A and 11B, the outer housing 15 is brought into contact with the back surface of the casing body 13 so that the four protrusions 42 of the outer housing 15 pass through the opening 33 of the casing body 13 and protrude on the front side of the casing body 13, and the first annular waterproof member 29 is fitted into the inside of the outer housing 15 from the front side of the casing body 13. Next, the ground shell 18 is moved toward the outer housing 15 as the cylindrical portion 45 of the ground shell 18 is inserted in the first waterproof member 29, thereby inserting the four protrusions 42 of the outer housing 15 into the four mounting holes 47 of the ground shell 18 and also inserting the three bosses 36 of the casing body 13 into the three boss insertion portions 22 of the ground shell 18. In addition, the inner housing 20 is positioned on the front side of the ground shell 18 so that the connector terminals 19 for external device connection of the inner housing 20 are inserted into the cylindrical portion 45 of the ground shell 18, and the four protrusions 42 of the outer housing 15 are inserted into the four mounting holes 48 of the inner housing 20.

More specifically, the four protrusions 42 of the outer housing 15 are sequentially inserted into the four mounting holes 47 of the ground shell 18 and the four mounting holes 48 of the inner housing 20, respectively. In this state, the tips of the four protrusions 42 are melted by heating to weld the protrusions 42 of the outer housing 15 and the inner housing 20 which are each made of an insulating resin to each other, whereby the outer housing 15 and the inner housing 20 are fixed to the ground shell 18. The first waterproof member 29 is sandwiched and held between the ground shell 18 and the outer housing 15.

It should be noted that the tips of the protrusions 42 can be heated by, for example, irradiation with a laser beam. Although the number of the protrusions 42 of the outer housing 15 is not limited to four, two or more protrusions 42 of the outer housing 15 are preferably inserted for welding into two or more mounting holes 47 of the ground shell 18 and two or more mounting holes 48 of the inner housing 20, respectively, for the positioning of the ground shell 18 with respect to the outer housing 15 and the inner housing 20.

Figure 12:
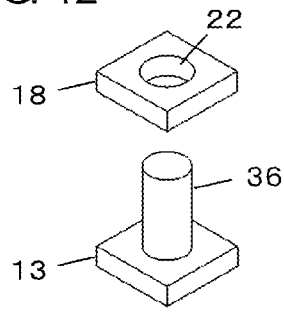
FIG. 12 is a perspective view showing a combination of a boss of the casing body with a boss insertion portion of the ground shell.
Figure 13A:
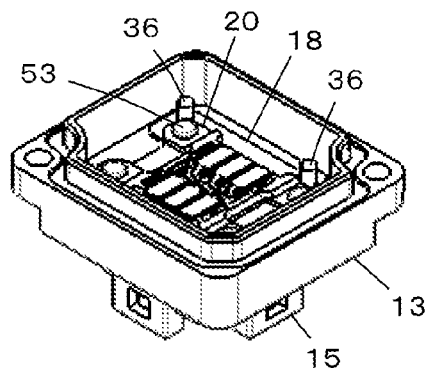
FIGS. 13A and 13B are a perspective view and a partial cross-sectional view, respectively, showing a state in which the boss of the casing body is inserted into the boss insertion portion of the ground shell.
Figure 13B:
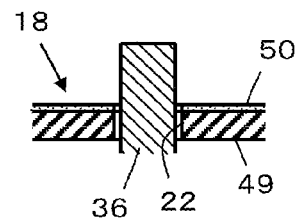

In addition, as shown in FIG. 12, each boss 36 of the casing body 13 has a columnar shape and each boss insertion portion 22 of the ground shell 18 is formed of a circular hole having a slightly larger diameter than that of the boss 36. When the tips of the protrusions 42 of the outer housing 15 are welded to the inner housing 20 to form resin weld zones 53 and the outer housing 15, the ground shell 18 and the inner housing 20 are integrated with each other as shown in FIG. 13A, the heads of the bosses 36 of the casing body 13 inserted into the boss insertion portions 22 of the ground shell 18 are exposed on the front surface of the ground shell 18 to protrude on the tin-plated layer 50, as shown in FIG. 13B.

Figure 14A:
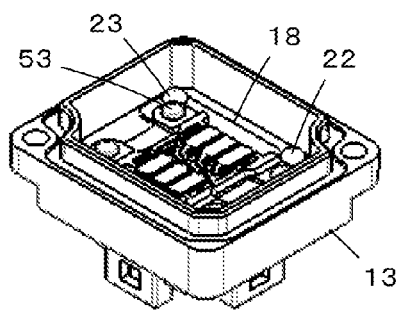
FIGS. 14A and 14B are a perspective view and a partial cross-sectional view, respectively, showing a state in which a head of the boss of the casing body is welded to a coated layer of the ground shell.
Figure 14B:
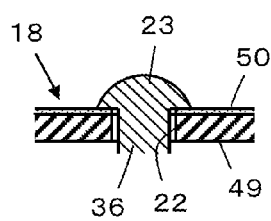

By heating to melt the head of the boss 36 thus exposed on the front surface of the ground shell 18, for example, through irradiation with a laser beam, the metal weld zone 23 in which the head of the boss 36 of the casing body 13 made of aluminum and the tin-plated layer 50 of the ground shell 18 positioned on the periphery of the boss insertion portion 22 are welded to each other is formed as shown in FIGS. 14A and 14B. The heads of the three bosses 36 of the casing body 13 are likewise welded to the tin-plated layer 56 on the peripheries of the boss insertion portions 22 of the ground shell 18 corresponding to the bosses 36. The ground shell 18 is thus electrically connected and firmly fixed to the casing body 13.

In addition, by potting a resin material, the sealed portion 31 is formed between the casing body 13 and the outer housing 15, and the sealed portion 32 is formed on the back side portion of the inner housing 20 between the ground shell 18 and the connector terminals 19 for external device connection, as shown in FIG. 3.

Figure 15:
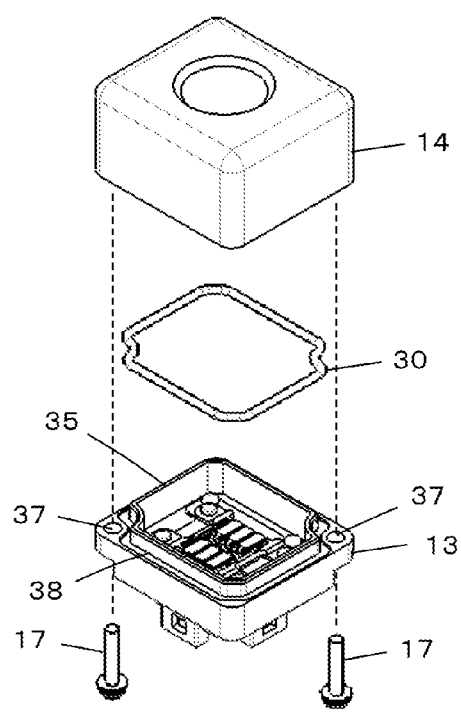
FIG. 15 is an assembly diagram showing how to fix the casing body to the cover member.

The assembly of the electronic device module 11 is completed by attaching the cover member 14 with the printed circuit board 24 fixed therein to the casing body 13 to which the ground shell 18 integrated with the outer housing 15 and the inner housing 20 is fixed by the foregoing procedure. In this process, as shown in FIG. 15, the second annular waterproof member 30 is inserted into the annular groove 38 formed along the peripheral wall 35 of the casing body 13, the cover member 14 is placed on the peripheral wall 35 of the casing body 13, and the two screws 17 are passed through their corresponding mounting holes 37 of the casing body 13 from the back side of the casing body 13 and screwed into the screw holes 39 of the cover member 14, whereby the cover member 14 is joined to the peripheral wall 35 of the casing body 13, and the casing body 13 and the cover member 14 are fixed and electrically connected to each other.

By attaching the cover member 14 to the casing body 13, as shown in FIG. 3, the board connector terminals 28 of the board connector 27 mounted on the rear surface 24b of the printed circuit board 24 fixed to the cover member 14 are brought into contact with the electrode portions 21 held on the surface of the inner housing 20 attached to the casing body 13 so that the electrodes of the image sensor 26 are connected to the connector terminals 19 for external device connection.

As described above, according to the electronic device module 11 of Embodiment 1, the ground shell 18 and the casing body 13 are electrically connected to each other by welding the heads of the bosses 36 of the casing body 13 and the tin-plated layer 50 of the ground shell 18 positioned on the peripheries of the boss insertion portions 22 to each other without forming spring contacts, and the casing body 13 and the cover member 14 are electrically connected to each other by fastening the cover member 14 to the casing body 13 with the screws. Therefore, it is possible to obtain consistent shielding effectiveness for the image sensor 26, the printed circuit board 24, the board connector 27, the electrode portions 21 and the connector terminals 19 for external device connection placed inside the electronic device module 11.

The ground shell 18 is fixed and connected to the casing body 13 by welding the heads of the bosses 36 of the casing body 13 to the tin-plated layer 50 of the ground shell 18 and therefore there is no need to form spring contacts and dissimilar metals for use in, for example, joining through brazing are also unnecessary, which makes it possible to reduce the manufacturing costs while simplifying the manufacturing process.

In addition, the first waterproof member 29 is provided between the ground shell 18 and the outer housing 15, the second waterproof member 30 is provided between the casing body 13 and the cover member 14, the sealed portion 31 is formed by potting between the casing body 13 and the outer housing 15, and the sealed portion 32 is formed by potting on the back side portion of the inner housing 20 between the ground shell 18 and the connector terminals 19 for external device connection. Accordingly, a remarkable waterproof effect can be exerted on the image sensor 26, the printed circuit board 24, the board connector 27, the electrode portions 21 and the connector terminals 19 for external device connection placed inside the electronic device module 11.

The electronic device module 11 can be made to function as the in-vehicle camera module by attaching the cover member 14 to a body of a vehicle such as an automobile in a unified manner.

Figure 16:
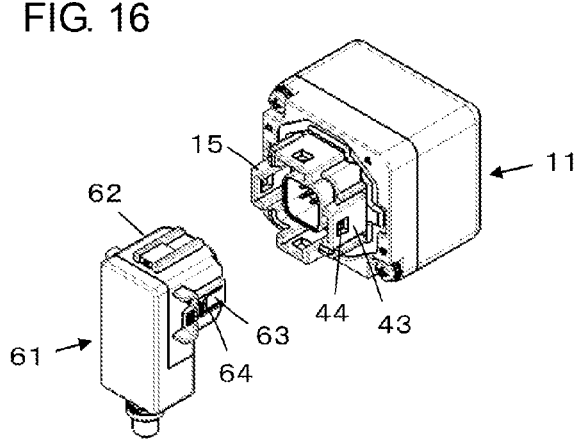
FIG. 16 is a perspective view showing a state in which an external device side connector is in proximity to the electronic device module according to Embodiment 1.

The electronic device module 11 is used in combination with an external device side connector 61, as shown in FIG. 16. The external device side connector 61 includes a connector housing 62 to be fitted into the outer housing 15 of the electronic device module 11. Beams 63 capable of elastic deformation are formed on the outer periphery of the connector housing 62 and a protrusion 64 is formed on each of the beams 63. The connector housing 62 has a shape and a size corresponding to those of the outer housing 15 and the protrusions 64 are formed at positions corresponding to the hook holes 44 in the legs 43 of the outer housing 15.

Figure 17:
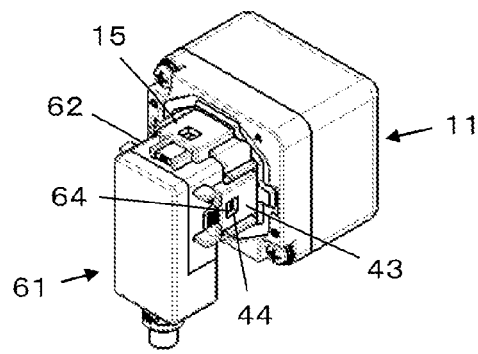
FIG. 17 is a perspective view showing a state in which the external device side connector is fitted into the electronic device module according to Embodiment 1.

As shown in FIG. 17, insertion of the external device side connector 61 into the electronic device module 11 causes the connector housing 62 to be fitted into the inside of the outer housing 15, and the protrusions 64 receive reactive forces from the legs 43 of the outer housing 15 to cause elastic deformation of the beams 63. Thereafter, when the protrusions 64 reach the hook holes 44 of the legs 43 of the outer housing 15, the beams 63 are released from the elastic deformation and the protrusions 64 are hooked into the hook holes 44. The external device side connector 61 is thus fitted and locked into the electronic device module 11.

Figure 18:
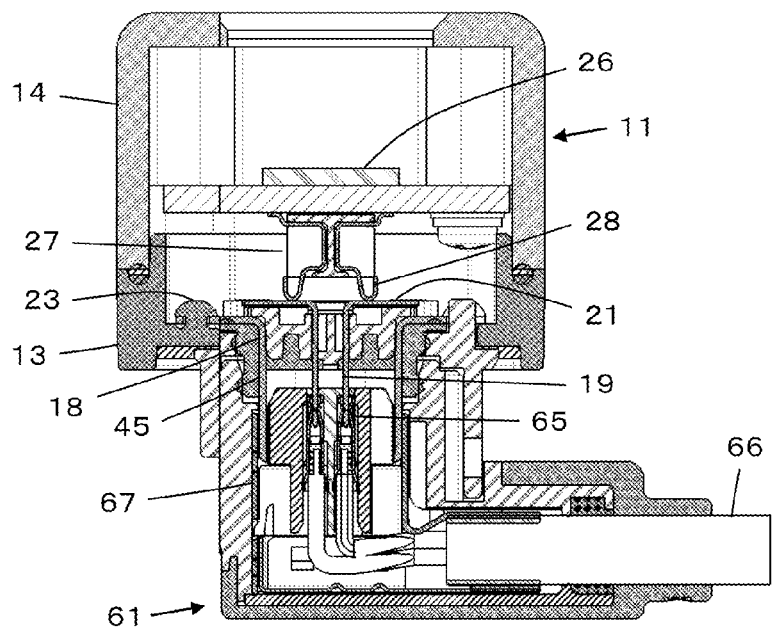
FIG. 18 is a cross-sectional view showing the state in which the external device side connector is fitted into the electronic device module according to Embodiment 1.

As shown in FIG. 18, the external device side connector 61 has connection terminals 65 held in the interior of the connector housing 62, and the connection terminals 65 of the external device side connector 61 are connected to the connector terminals 19 for external device connection of the electronic device module 11 by fitting the external device side connector 61 into the electronic device module 11. Therefore, output signals from the image sensor 26 inside the electronic device module 11 can be acquired through the connector terminals 19 for external device connection, the connection terminals 65 and further a cable 66 connected to the connection terminals 65.

A shield member 67 made of a cylindrical conductor is also disposed in the external device side connector 61 so as to surround the connection terminals 65, and when the external device side connector 61 is fitted into the electronic device module 11, the shield member 67 comes in contact with the cylindrical portion 45 of the ground shell 18 of the electronic device module 11 to establish electric connection. In this way, the portion where the connector terminals 19 for external device connection of the electronic device module 11 are connected to the connection terminals 65 of the external device side connector 61 is also shielded, which makes it possible to acquire signals output from the image sensor 26 while suppressing the effect of electromagnetic disturbance or the like.

In the above-described Embodiment 1, the casing body 13 and the cover member 14 are each formed of an aluminum material. However, this is not the sole material and the casing body 13 and the cover member 14 may also be formed of, for example, metals such as zinc or magnesium. Die-casting is not the sole method for manufacturing the casing body 13 and the cover member 14, and the casing body 13 and the cover member 14 can also be manufactured by press working, cutting or a method which involves molding and sintering metal powder.

The iron plate 49 whose surface is coated with the tin-plated layer 50 is used as the material for forming the ground shell 18. However, a plate made of other metal replacing iron can also be used. Nevertheless, an iron material is preferable because of easy machining and low cost. Metallic materials such as gold or nickel may also be used instead of tin to form the plated layer. In addition, the plated layer is not limited to a single layer but may include a plurality of layers. For example, it is also possible to form an intermediate nickel-plated layer on a copper-plated underlayer and then form a tin-plated layer on the intermediate layer. The formation method is not limited to plating but it is also possible to form the coated layer by various known thin-film formation methods.

Embodiment 2

In the above-described Embodiment 1, as shown in FIG. 12, each boss 36 of the casing body 13 has a columnar shape and each boss insertion portion 22 of the ground shell 18 is formed of a circular hole having a slightly larger diameter than that of the boss 36. However, the invention is not limited to this.

Figures 19A, 19B, 19C:
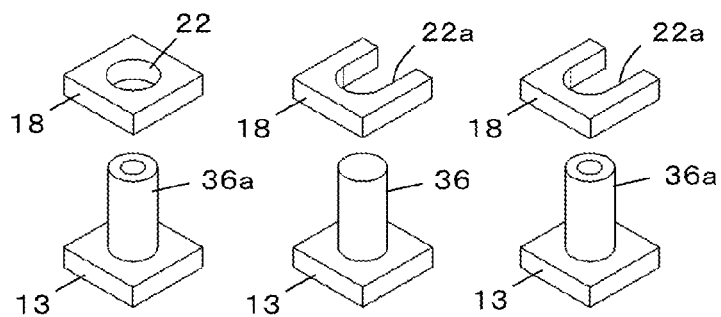
FIGS. 19A to 19C are perspective views showing various combinations of a boss and a boss insertion portion that may be used in an electronic device module according to Embodiment 2.

For example, as shown in FIG. 19A, a cylindrical boss 36a with a hollow interior replacing the columnar boss 36 may pass through the boss insertion portion 22 formed of a circular hole, and the head of the boss 36a and the coated layer of the ground shell 18 positioned on the periphery of the boss insertion portion 22 may be welded to each other.

As shown in FIG. 19B, each boss 36 may be fitted into a boss insertion portion 22a formed of a cutout having an arc-like portion corresponding to the curvature of the columnar boss 36 instead of the boss insertion portion 22 formed of a circular hole. Also in this case, by welding the head of the boss 36 and the coated layer of the ground shell 18 positioned on the periphery of the boss insertion portion 22a to each other, the ground shell 18 can be electrically connected and firmly fixed to the casing body 13.

In addition, as shown in FIG. 19C, the cylindrical boss 36a with a hollow interior may be welded to the coated layer of the ground shell 18 positioned on the periphery of the boss insertion portion 22a formed of a cutout.

The combination of a boss 36b in the shape of a quadrangular prism with a boss insertion portion 22b formed of a quadrangular hole as shown in FIG. 20A, the combination of a square tube-shaped boss 36c quadrangular in cross-section with the boss insertion portion 22b formed of a quadrangular hole as shown in FIG. 20B, the combination of the boss 36b in the shape of a quadrangular prism with a boss insertion portion 22c formed of a quadrangular cutout as shown in FIG. 20C, and the combination of the square tube-shaped boss 36c quadrangular in cross-section with the boss insertion portion 22c formed of a quadrangular cutout as shown in FIG. 20D are also possible, and the ground shell 18 can be likewise electrically connected and firmly fixed to the casing body 13 by welding the respective parts to each other.

In addition, the combination of a boss 36d in the shape of a triangular prism with a boss insertion portion 22d formed of a triangular hole as shown in FIG. 21A, the combination of a triangular tube-shaped boss 36e triangular in cross-section with the boss insertion portion 22d formed of a triangular hole as shown in FIG. 21B, the combination of the boss 36d in the shape of a triangular prism with a boss insertion portion 22e formed of a triangular cutout as shown in FIG. 21C, and the combination of the triangular tube-shaped boss 36e triangular in cross-section with the boss insertion portion 22e formed of a triangular cutout as shown in FIG. 21D are also possible, and the ground shell 18 can be electrically connected and firmly fixed to the casing body 13 by welding the respective parts to each other.

There is no restriction to the cross-sectional shape of the boss and the shape of the boss insertion portion as long as the head of the boss is exposed on the front surface of the ground shell upon insertion of the boss formed in the metallic casing into the boss insertion portion formed in the metallic ground shell, and the head of the boss and the coated layer of the ground shell positioned on the periphery of the boss insertion portion can be welded to each other.

In the above-described Embodiment 1, the casing body 13 has the three bosses 36 and the ground shell 18 has the three boss insertion portions 22. However, the number of pairs of bosses and boss insertion portions is not limited to three, and the ground shell 18 can be electrically connected and firmly fixed to the casing body 13 by using at least one pair of a boss and a boss insertion portion and welding the head of the boss and the coated layer to each other.

This invention is not limited to the in-vehicle camera module but may be applied to each of various electronic device modules in which an electronic device unit to be connected to an external device through connector terminals for external device connection is placed in a metallic casing.

What is claimed is:

1. An electronic device module comprising:
a metallic casing having at least one boss formed therein;
an electronic device unit placed inside the casing;
connector terminals for external device connection electrically connected to the electronic device unit and used to connect the electronic device unit to an external device; and
a metallic ground shell disposed so as to surround the connector terminals for external device connection, having a front surface covered with a metal coated layer and including at least one boss insertion portion formed so as to correspond to the at least one boss of the casing;
wherein the at least one boss has a head exposed on the front surface of the ground shell covered with the coated layer upon insertion of the at least one boss into the at least one boss insertion portion corresponding to the at least one boss, and
wherein the electronic device module has at least one metal weld zone which is formed by welding the head of the at least one boss inserted into the at least one boss insertion portion to the coated layer positioned on a periphery of the at least one boss insertion portion so that the ground shell is electrically connected and fixed to the casing.

2. The electronic device module according to claim 1, wherein the at least one boss insertion portion comprises a hole through which the at least one boss corresponding to the at least one boss insertion portion passes or a cutout into which the at least one boss corresponding to the at least one boss insertion portion is fitted.

3. The electronic device module according to claim 1, wherein the ground shell is made of an iron material having a tin-plated layer formed on its surface as the coated layer, and the at least one boss is made of aluminum.

4. The electronic device module according to claim 1, further comprising an outer housing formed of an insulating material, attached to the ground shell and fitted into a connector housing of an external device side connector.

5. The electronic device module according to claim 4, further comprising an inner housing including the connector terminals for external device connection mounted thereon and formed of an insulating material,
wherein the connector terminals for external device connection are fixed to the ground shell via the inner housing.

6. The electronic device module according to claim 5, wherein the outer housing has a plurality of protrusions, wherein each of the ground shell and the inner housing has a plurality of holes corresponding to the plurality of protrusions in the outer housing, and wherein, in a state in which the plurality of protrusions in the outer housing are sequentially inserted into the plurality of holes of the ground shell and the plurality of holes of the inner housing, tips of the plurality of protrusions are welded to the inner housing to fix the outer housing and the inner housing to the ground shell.

7. The electronic device module according to claim 5,
wherein the inner housing holds electrode portions electrically connected to the connector terminals for external device connection,
wherein the electronic device unit includes a printed circuit board, an electronic component mounted on the printed circuit board, and a board connector fixed to the printed circuit board and having board connector terminals, and
wherein the board connector terminals of the electronic device unit are brought into contact with the electrode portions to electrically connect the electronic component to the connector terminals for external device connection.

8. The electronic device module according to claim 7,
wherein the casing includes a casing body and a cover member fastened to the casing body with screws,
wherein the casing body includes a bottom plate having an opening formed at a center of the bottom plate and a peripheral wall formed on a perimeter of the bottom plate, and the at least one boss is formed on the bottom plate,
wherein the cover member is joined to the peripheral wall of the casing body, and
wherein the ground shell has a cylindrical portion to be inserted in the opening of the casing body and a flat plate portion extending on a periphery at one end of the cylindrical portion, and the at least one boss insertion portion is formed in the flat plate portion.

9. The electronic device module according to claim 8,
wherein the printed circuit board is fastened to the cover member with screws, and
wherein the cover member is joined to the peripheral wall of the casing body to bring the board connector terminals of the electronic device unit into contact with the electrode portions.

10. The electronic device module according to claim 8, further comprising a first waterproof member disposed between the ground shell and the outer housing.

11. The electronic device module according to claim 8, further comprising a second waterproof member disposed between the peripheral wall of the casing body and the cover member
wherein the casing body and the cover member are fastened to each other with the screws with the second waterproof member sandwiched therebetween.

12. The electronic device module according to claim 8, wherein sealing is established by potting between the casing body and the outer housing.

13. The electronic device module according to claim 8, wherein sealing is established by potting between the ground shell and the connector terminals for external device connection.

14. The electronic device module according to claim 8,
wherein the cover member is integrated with a body of a vehicle, and
wherein the electronic device unit comprises a camera unit.

* * * * *